US009278843B2

(12) United States Patent
Reddy

(10) Patent No.: US 9,278,843 B2
(45) Date of Patent: Mar. 8, 2016

(54) MIXING NOZZLE FITMENTS

(71) Applicant: NESTEC S.A., Vevey (CH)

(72) Inventor: Balakrishna Reddy, Dublin, OH (US)

(73) Assignee: Nestec S.A., Vevey (CH)

( * ) Notice: Subject to any disclaimer, the term of this patent is extended or adjusted under 35 U.S.C. 154(b) by 407 days.

(21) Appl. No.: 14/040,998

(22) Filed: Sep. 30, 2013

(65) Prior Publication Data

US 2014/0027472 A1 Jan. 30, 2014

Related U.S. Application Data

(60) Continuation of application No. 13/589,309, filed on Aug. 20, 2012, now Pat. No. 8,591,099, which is a division of application No. 12/420,523, filed on Apr. 8, 2009, now abandoned.

(51) Int. Cl.

*B67D 1/00* (2006.01)
*F16K 15/14* (2006.01)
*B01F 15/02* (2006.01)
*B01F 5/04* (2006.01)

(52) U.S. Cl.

CPC ............ *B67D 1/0044* (2013.01); *B67D 1/0021* (2013.01); *B01F 5/0471* (2013.01); *B01F 5/0496* (2013.01)

(58) Field of Classification Search

CPC ... B01F 5/0471; B01F 5/0496; B67D 1/0021; B67D 1/0044

See application file for complete search history.

(56) References Cited

U.S. PATENT DOCUMENTS

| | | | |
|---|---|---|---|
| 1,145,271 | A | 7/1915 | Scanlan |
| 1,901,797 | A | 3/1933 | Black |
| 1,967,799 | A | 7/1934 | Wittemann |
| 2,302,799 | A | 11/1942 | Peterson |
| 2,310,265 | A | 2/1943 | Sweeny |
| 2,432,146 | A | 12/1947 | Farris et al. |
| 2,785,833 | A | 3/1957 | Bauerlein et al. |
| 3,128,994 | A | 4/1964 | Hungate |
| 3,231,140 | A | 1/1966 | Krup |
| 3,295,723 | A | 1/1967 | Welty |
| 3,324,877 | A | 6/1967 | Bochan |
| 3,818,938 | A | 6/1974 | Carson |
| 4,164,960 | A | 8/1979 | Howard |
| 4,186,772 | A | 2/1980 | Handleman |
| 4,552,286 | A | 11/1985 | Kuckens et al. |
| 5,601,210 | A | 2/1997 | Kelly et al. |
| 5,685,639 | A | 11/1997 | Green |
| 5,836,484 | A | 11/1998 | Gerber |
| 6,122,980 | A | 9/2000 | Lewis et al. |

(Continued)

FOREIGN PATENT DOCUMENTS

| | | |
|---|---|---|
| BE | 549933 | 8/1956 |
| DE | 4213895 | 11/1992 |

(Continued)

*Primary Examiner* — Tony G Soohoo
(74) *Attorney, Agent, or Firm* — K&L Gates LLP

(57) ABSTRACT

Mixing nozzle fitments and beverage devices containing the mixing nozzle fitments are provided. In an embodiment, the mixing nozzle fitment includes a first shaft defining an inlet passage, a second shaft defining a curved outlet passage and attached to the first shaft, and a coupling member attached to the second shaft. The coupling member defines a passage that leads into the curved outlet passage of the second shaft. The mixing nozzle fitment can be used in any suitable beverage dispensing device.

9 Claims, 4 Drawing Sheets

(56) References Cited

U.S. PATENT DOCUMENTS

| | | | | |
|---|---|---|---|---|
| 6,422,608 | B1 | 7/2002 | Lee et al. | |
| 7,021,206 | B2 | 4/2006 | Eckenhausen et al. | |
| 7,111,759 | B1 | 9/2006 | Gorski | |
| 7,243,682 | B2 | 7/2007 | Brandes | |
| 8,591,099 | B2 * | 11/2013 | Reddy .................. | B67D 1/0021 366/167.1 |
| 2010/0260892 | A1 | 10/2010 | Reddy | |

FOREIGN PATENT DOCUMENTS

| | | |
|---|---|---|
| FR | 1220104 | 5/1960 |
| WO | 0121292 | 3/2001 |
| WO | 2008098154 | 8/2008 |

* cited by examiner

MIXING NOZZLE FITMENTS

PRIORITY CLAIM

This application is a continuation application of U.S. patent application Ser. No. 13/589,309, filed on Aug. 20, 2012 which is a divisional application of U.S. patent application Ser. No. 12/420,523, filed on Apr. 8, 2009, the entire disclosure of which is incorporated herein by reference.

BACKGROUND

The present disclosure generally relates to beverage dispensing devices. More specifically, the present disclosure relates to mixing nozzle fitments for dispensing beverages.

There are a variety of beverage dispensers currently on the market. Some beverage dispensers operate by dispensing a hot or cold ready-to-drink fluid directly into a container such as a cup. Other beverage dispensers operate by dispensing a powdered or liquid concentrate along with a separate diluent through a beverage dispensing nozzle and into a container or cup to form the drink. The relative flows of the concentrate and diluent into the cup can be controlled to maximize the qualities of the beverage such as mixing and foam production. Nevertheless, many of the beverage dispensers suffer from quality control issues related to insufficient mixing of the concentrate and diluent or accumulation of the concentrate in the beverage dispensing nozzles.

SUMMARY

The present disclosure relates to mixing nozzle fitments and beverage dispensing devices using the mixing nozzle fitments. In a general embodiment, the mixing nozzle fitment includes a first shaft defining an inlet passage, a second shaft defining a curved outlet passage and attached to the first shaft, and a coupling member attached to the second shaft. The coupling member defines a passage that leads into the curved outlet passage of the second shaft. The design of the mixing nozzle fitment minimizes concentrate accumulation within the mixing nozzle fitment to improve the hygienicity of the mixing nozzle fitment.

In an embodiment, the second shaft is the shape of a curved horn.

In an embodiment, the coupling member includes an expanded member and a catch.

In an embodiment, the second shaft is almost vertical near or at approximately an end portion of the second shaft opposed to the coupling member.

In an embodiment, the coupling member is positioned on the second shaft at a location ranging anywhere from a second end of the first shaft to about half way down the second shaft.

In an embodiment, the second shaft includes a flange.

In an embodiment, the first shaft and/or the second shaft includes a textured grip.

In an embodiment, the first shaft and/or the second shaft includes a cylindrical shape.

In an embodiment, the first shaft includes a first end and a second end, and the first end having a diameter that is smaller than the diameter of the second end.

In an embodiment, the second shaft includes a first end and a second end, and the first end having a diameter that is smaller than the diameter of the second end.

In another embodiment, the present disclosure provides a mixing nozzle fitment including a first cylindrical shaft defining an inlet passage, a second cylindrical shaft defining a curved outlet passage and attached to the first shaft, a coupling member attached to the second shaft, and a handle attached to the second shaft. The coupling member defines a passage that leads into the curved outlet passage of the second shaft.

In an alternative embodiment, the present disclosure provides a dispensing device including a concentrate container, a tube attached to the concentrate container, a pump operatively connected to the tube, and a mixing nozzle fitment. The mixing nozzle fitment includes a first shaft defining an inlet passage, a second shaft defining a curved outlet passage and attached to the first shaft, and a coupling member attached to the second shaft and defining a passage that leads into the curved outlet passage of the second shaft. The tube is removably attached to the coupling member. A diluent dispensing nozzle is removably attached to the coupling member of the mixing nozzle fitment.

In an embodiment, the concentrate container, the tube, the pump, the diluent dispenser and a portion of the mixing nozzle fitment are contained within a housing.

In an embodiment, the coupling member includes an expanded member and a catch for receiving the tube.

In yet another embodiment, the present disclosure provides a method of making a beverage. The method comprises providing a mixing nozzle fitment including a first shaft defining an inlet passage, a second shaft defining a curved outlet passage and attached to the first shaft, and a coupling member attached to the second shaft and defining a passage that leads into the curved outlet passage of the second shaft. The first shaft is attached to a diluent dispenser nozzle, and the coupling member is attached to a concentrate tube. A concentrate dispensed through the concentrate tube, and a diluent is dispensed through the diluent dispenser nozzle. The concentrate and the diluent are mixed in and dispensed out of the curved outlet passage of the mixing nozzle fitment to form the beverage.

In an embodiment, the diluent is water, milk, juice, coffee, tea, soda or a combination thereof.

In an embodiment, the concentrate is in a form such as paste, liquid or a combination thereof.

An advantage of the present disclosure is to provide an improved mixing nozzle fitment.

Another advantage of the present disclosure is to provide an improved dispensing device.

Still another advantage of the present disclosure is to provide a hygienic mixing nozzle fitment.

Yet another advantage of the present disclosure is to provide a mixing nozzle fitment that eliminates dead zones for product concentrates to collect in.

In addition, another advantage of the present disclosure is to provide an improved method of making a beverage.

Additional features and advantages are described herein, and will be apparent from, the following Detailed Description and the figures.

DETAILED DESCRIPTION

The present disclosure relates to mixing nozzle fitments and beverage dispensing devices using the mixing nozzle fitments. In alternative embodiments, the present disclosure can provide low cost and disposable mixing nozzle fitments for hygienic mixing and delivery of beverage products (e.g. non-sensitive products such as fruit juices, coffee) from concentrates in a dispensing system. The mixing nozzle fitments can be used to mix and dispense a diluent such as water and a beverage concentrate while avoiding dead zones in the mixing nozzle fitments where the beverage concentrate can accumulate. Because the mixing nozzle fitment can be disposed of when a depleted bag of concentrate is thrown away, the need for a dispensing system having an electrically operated mixing bowl or mixing chamber that requires specific cleaning-in-place or cleaning after disassembly can be eliminated.

Figure 1:
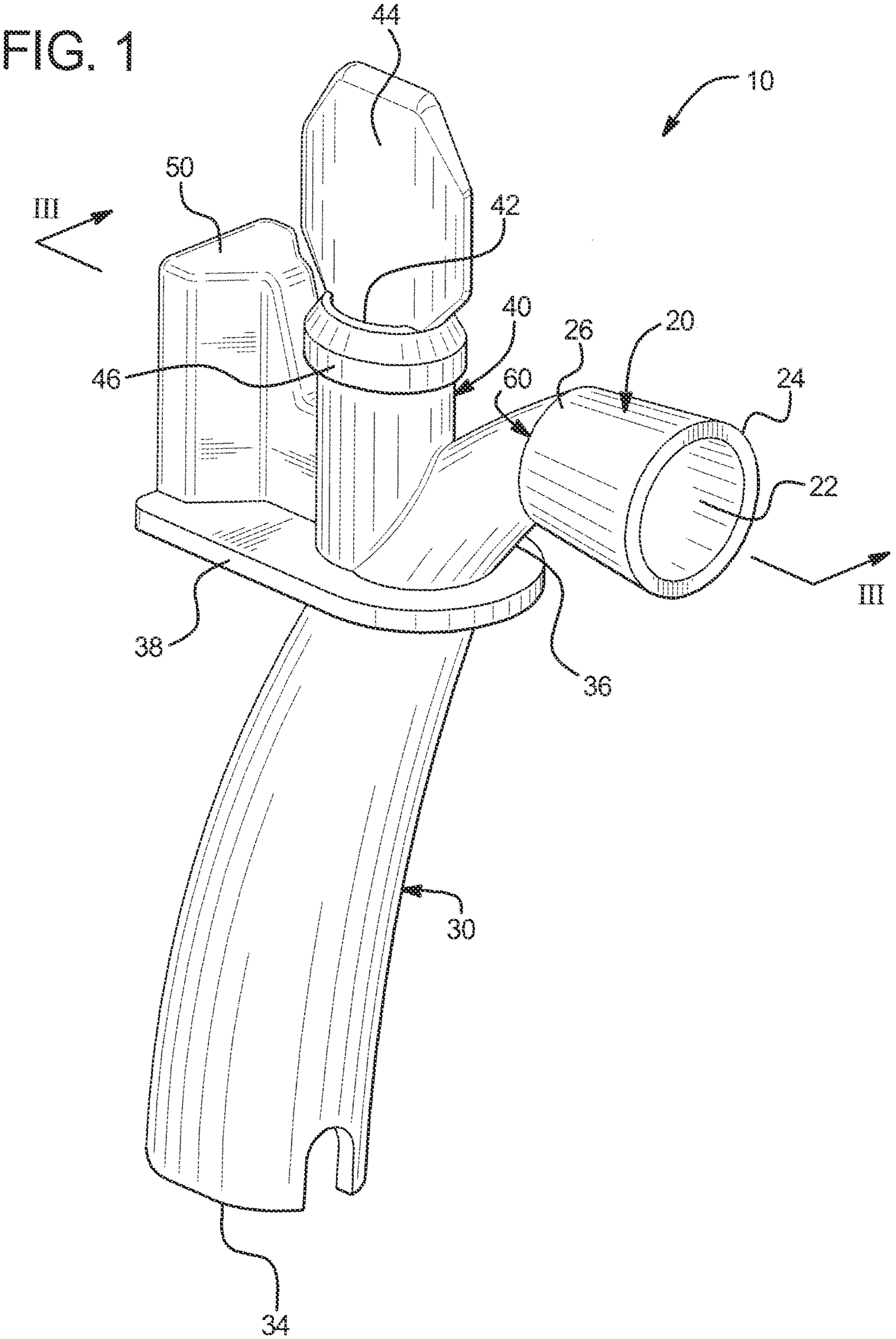
FIG. 1 illustrates a perspective view of a mixing nozzle fitment in an embodiment of the present disclosure.
Figure 2:
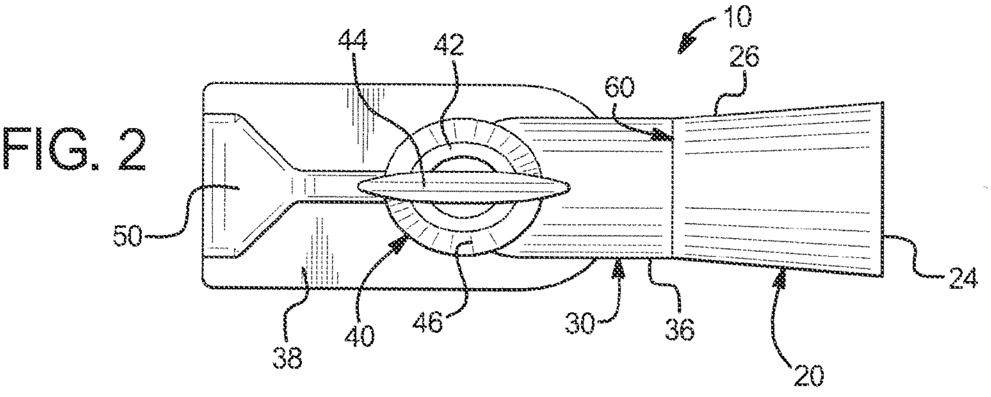
FIG. 2 illustrates a top view of the mixing nozzle fitment shown in FIG. 1.
Figure 3:
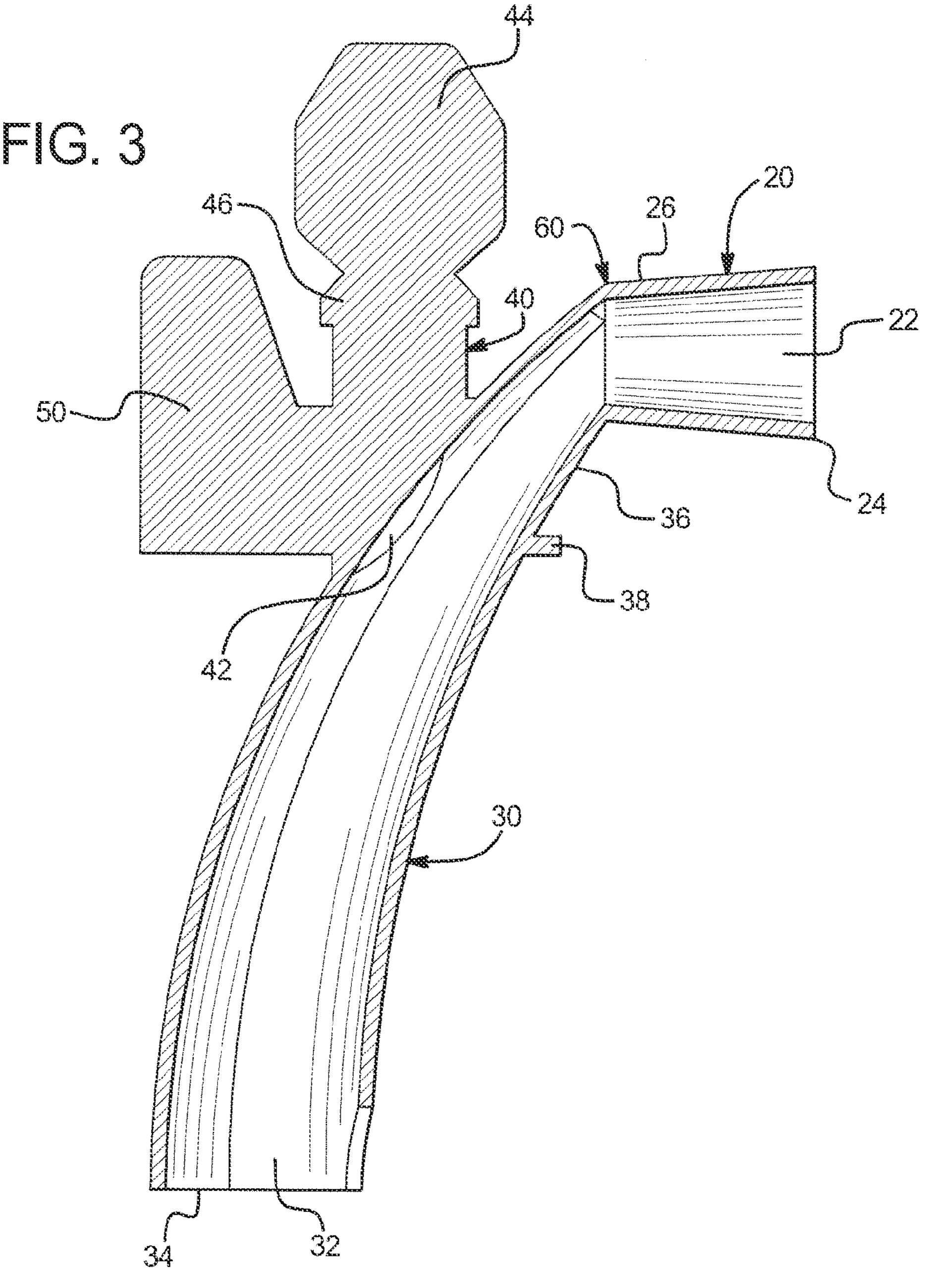
FIG. 3 illustrates a cross section view take along line III-III of the mixing nozzle fitment shown in FIG. 1.

In a general embodiment illustrated in FIGS. 1-3, a mixing nozzle fitment 10 includes a first shaft 20 defining a first passage 22 and a second shaft 30 defining a second curved passage 32 and attached to the first shaft 20. Second shaft 20 further includes a coupling member 40 and a handle 50 (handle 50 in FIG. 5). First shaft 20 acts as a fluid inlet and second shaft 30 acts as a fluid outlet.

In the illustrated embodiment, first shaft 20 has a cylindrical shape with a first end 24 that has a larger width or diameter than a second end 26 of first shaft 20. Similarly, second shaft 30 has a cylindrical shape having an oval/elliptical cross-section with a first end 34 that has a larger width or diameter than a second end 36 of second shaft 30. Second end 26 of first shaft 20 is attached to second end 36 of second shaft 30 at joint 60.

The dimensions of mixing nozzle fitment 10 can be any suitable size. For example, a key diameter for mixing nozzle fitment 10 can be based on the interface of a water valve it has to mate with. Other dimensions of mixing nozzle fitment 10 can be based on manufacturing ease.

Coupling member 40 can be positioned anywhere along second shaft 30 for example, from second end 26 of first shaft 26 to about half way down second shaft 30. Generally, the higher the inlet position of the concentrate inlet of coupling member 40, the better it is for mixing. Also, in an embodiment, the concentrate inlet should be positioned on the vertical portion of mixing nozzle fitment 10 such that the concentrate does not land onto a horizontal portion of first shaft 20.

In another embodiment, second shaft 30 can be designed to incorporate one or more fins (not shown) along its inner walls at an angle to enable better mixing of the concentrate. In yet another embodiment, second shaft 30 may be designed to incorporate a circuitous path (e.g. passage) such that the concentrate and diluent is mixed well by going through a circular path with a downward gradient through second shaft 30.

First shaft 20 and/or second shaft 30 can include various suitable perimeter/cross-sectional shapes such as, for example, polygonal, ellipsoidal, square, oval, triangular, etc. In an alternative embodiment, the opposing ends of first shaft 20 and second shaft 30 can have the same width/diameter.

First shaft 20 is constructed and arranged to be removably attached to any suitable diluent dispensing nozzle or a bore of a diluent line from a dispensing device or machine. For example, first shaft 20 can surround an internal outlet of the diluent dispensing nozzle, which can be firmly fitted inside first passage 22 of first shaft 20. The diluent dispensing nozzle should form a tight seal with first shaft 20 to prevent any diluent from leaking at the connection point between first shaft 20 and the dispensing nozzle. As a result, the diluent will not accumulate (e.g. in a dead zone) in any part of first passage 22 of first shaft 20.

The embodiment illustrated in FIGS. 1-3 shows that second shaft 30 has a curved shape (e.g. continuously bending line, without angles) from second end 36 to first end 34, for example, in the form of a curved horn. In this regard, second shaft 30 defines a flow passage 32 that is also curved (e.g. continuously bending line, without angles) from second end 36 to first end 34. In addition, in an embodiment, second shaft 30 is designed so that the internal width/diameter of passage 32 steadily increases from second end 36 to first end 34.

Coupling member 40 defines a passage 42 and is positioned downstream or below joint 60 between second end 26 of first shaft 20 and second end 36 of second shaft 30. Passage 42 of coupling member 40 leads into second passage 32 of second shaft 30. In this manner, coupling member 40 can act as a concentrate outlet for a concentrate to mix with a diluent inside passage 32.

Coupling member 40 can also include an expanded member 44 and a catch 46. A tube attached at one end to a concentrate container can be attached at the other end to coupling member 40 by placing the end of the tube over coupling member 40. For example, the open end of the tube can be stretched and placed over expanded member 44 and catch 46 of coupling member 40.

Coupling member 40 is designed to be connected to a hose for delivering a product such as a concentrate. The hose usually is made of a flexible material so that it can be compressed by means of a pump device, which preferably is a hose pump and most preferably a peristaltic pump that is provided in a drink dispenser. The flexible material of the hose also allows it to resume its original shape after being compressed. Expanded member 44 can have a larger width than the outer diameter of coupling member 40 and thus be designed to ensure that the hose is steadily attached thereto without hose clamps and similar.

Expanded member 44 can serve a pressure activated valve function when connected to such a hose. For instance, expanded member 44 closes the tube when the pump device does not apply any pressure on the tube. Expanded member 44 can also facilitate the handling of the concentrate during loading and unloading of the concentrate into the machine.

The pressure activated valve can be preferably operated in such way that it opens automatically when the pump device is operating and thereby increases the pressure in the hose and closes automatically when the pump device is disabled and the pressure thereby decreases in the hose. The pump device may be a peristaltic pump or a hose pump of another type that does not compress the hose when the hose is disabled. The hose is threaded over catch 46 and over expanded member 44 of coupling member 40. Accordingly, expanded member 44 expands the flexible hose such that it engages expanded member 44 with a uniform pressure therearound. In this position and without any activation of the pump, the hose end is closed.

When the pump device starts to pump concentrate through the hose, a pressure increase occurs in the hose that is sufficient to expand the outer part of the hose around expanded member 44 such that the concentrate can flow around expanded member 44 and then through passage 42. When the pressure ceases, the outer part of the hose retracts around expanded member 44 and closes the hose, which thereby simply prevents concentrate from unintentionally dripping down into the device.

The configuration of mixing nozzle fitment 10 solves the problem of product accumulation in dead zones within passage 32 of mixing nozzle fitment 10. For example, the curved horned shape of second shaft 30 (outlet end) and passage 32 of mixing nozzle fitment 10 is designed to minimize any beverage concentrate accumulation inside passage 32. In addition, by having concentrate outlet (passage 42) emerge in the diluent conduit downstream (passage 32) of joint 60, when the diluent flow enters in contact with the concentrate, the diluent presents a force sufficient to drag along the concentrate emerging from the concentrate outlet. As a result, no concentrate accumulation is observed in the mixing nozzle fitment 10, which maximizes the hygienicity of mixing nozzle fitment 10.

In alternative embodiments, the mixing nozzle fitment can include any suitable mechanism for attaching to the diluent dispensing nozzle or the diluent line of a dispensing device. For example, the mixing nozzle fitment can include a twist-to-lock feature (e.g. threading on the first shaft) to engage and lock the mixing nozzle fitment to the diluent dispensing nozzle or the diluent line of the dispensing device. Alternatively, the mixing nozzle fitment can include clamps or snap fits that engage with the diluent dispensing nozzle or the diluent line of the dispensing device to lock the mixing nozzle fitment in place.

Second shaft 30 can include a flange 38. Flange 38 can be used as the border when mixing nozzle fitment 10 is used within a housing for a beverage dispenser. For example, the housing containing a beverage device can be opened (e.g. through a front panel door) to receiving the mixing nozzle fitment. When the housing is closed, the only exposed portion of mixing nozzle fitment 10 is a portion below flange 34.

Handle 50, 250 can be any suitable shape that allows a user to securely hold mixing nozzle fitment 10. During use, handle 10, 250 can be grasped by a user who is inserting mixing nozzle fitment 10 into a beverage dispensing device. Handle 50, 250 can also be grasped when removing mixing nozzle fitment 10 from the beverage dispensing device.

In an embodiment, the mixing nozzle fitment can be in the form of a single unitary piece (e.g. molded). Alternatively, the mixing nozzle fitment can be made from a combination of separately made pieces that are attached together via process known in the art. It should be appreciated that the components of the mixing nozzle fitment can be made from any suitable material such as, for example, metal, rigid plastics or polymers or combinations thereof.

Figure 4:
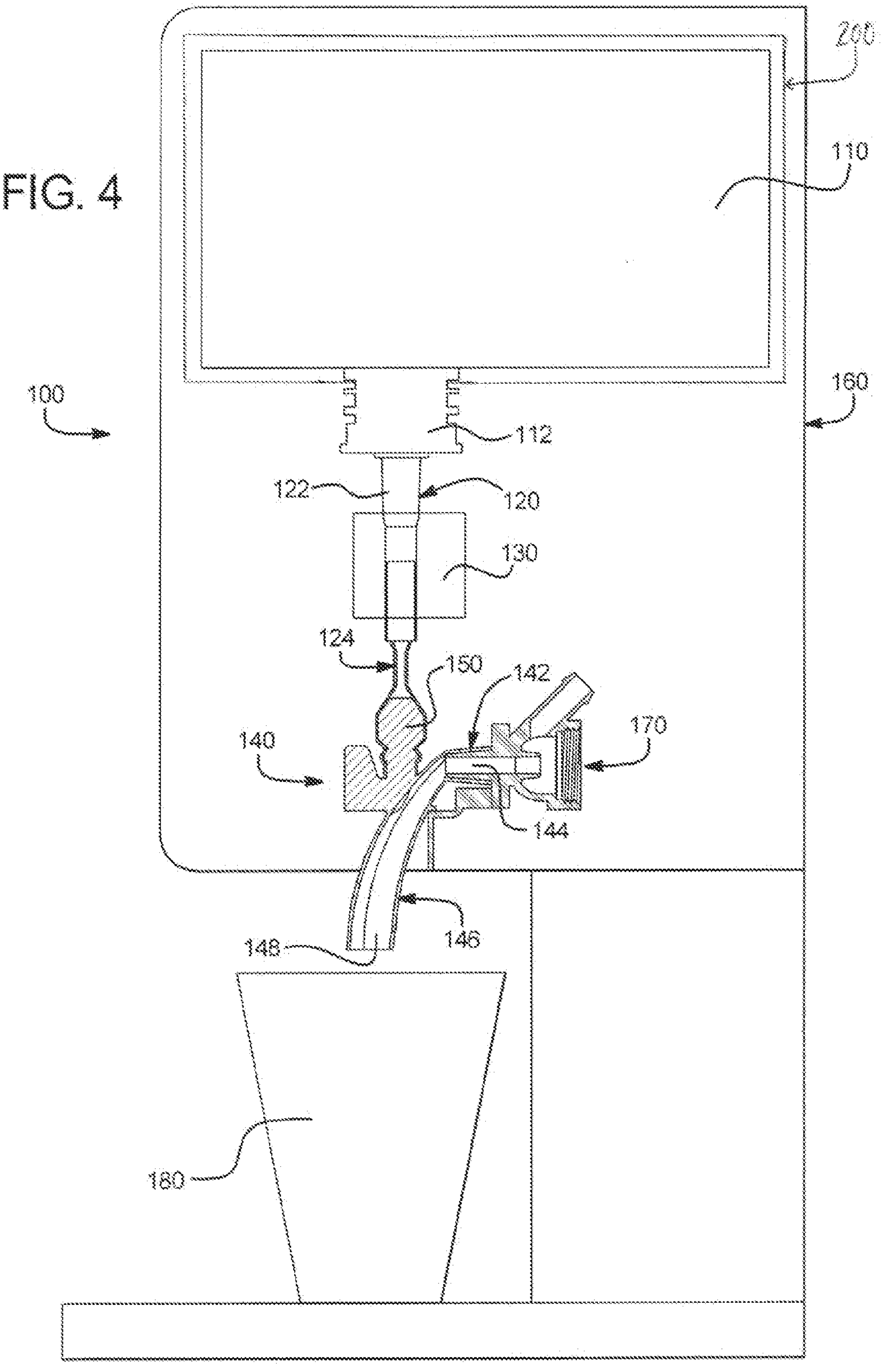
FIG. 4 illustrates a cross section view of a dispensing device having a mixing nozzle fitment in an embodiment of the present disclosure.

In an another embodiment illustrated in FIG. 4, the present disclosure provides a dispensing device 100 including a concentrate container 110, a tube 120 having a first end 122 that is attached to an outlet 112 of concentrate container 110 and a pump 130 operatively connected to tube 120. Pump 130 can be, for example, a peristaltic pump that pushes concentrate from concentrate container 110 through tube 120 via a plurality of rotating rollers.

Dispensing device 100 further includes a mixing nozzle fitment 140 including a first shaft 142 defining a first passage 144 and a second shaft 146 defining a second passage 148 and attached to first shaft 142 (e.g. in an embodiment similar to that shown in FIGS. 1-3). Second shaft 146 includes a coupling member 150. Tube 120 can include an end portion 124 that can be removably attached to coupling member 150 of mixing nozzle fitment 140, for example, by being stretched and placed over coupling member 150.

First shaft 142 of mixing nozzle fitment 140 can be removably attached to a diluent line or diluent dispenser 170. Diluent dispenser 170 can be fluidly connected to any suitable diluent reservoir and motor or pump (not shown) for driving the diluent from the reservoir through the diluent dispenser and subsequently through mixing nozzle fitment 140.

Concentrate container 110, tube 120, pump 130, diluent dispenser 170 and mixing nozzle fitment 140 (or a portion thereof) can be contained within any suitable housing 160. As previously discussed, housing 160 containing the beverage device can be opened (e.g. through a front panel door) to receive removable mixing nozzle fitment 140. When housing 160 is closed, for example, the exposed part of mixing nozzle fitment 140 can be a portion below a flange of mixing nozzle fitment 140. Housing 160 can be constructed and arranged so that mixing nozzle fitment 140 dispenses the mixed concentrate and diluent directly into a cup or container 180 as illustrated in FIG. 4. The dispensing device 100 can contain a refrigerated compartment 200 in which the concentrate container 110 is placed, and the mixing nozzle fitment 140 can comprise a flange on the second shaft 146 so as to isolate the refrigerated compartment 200 from the rest of the dispensing device 100.

Mixing nozzle fitment 140 can seal tightly against diluent dispenser 150 and be easily locked into place. Mixing nozzle fitment 140 permits a supply of hot or cold liquid such as water to dilute and mix with stable, packaged liquid concentrates, and dispense into cup 180. Mixing nozzle fitment 140 provides a way to keep the liquid concentrate from accumulating in any dead zones, which may create sanitary issues (e.g. microbial or quality issues) when the liquid concentrate resides there over time while the beverage dispenser is not in use.

Figure 5:
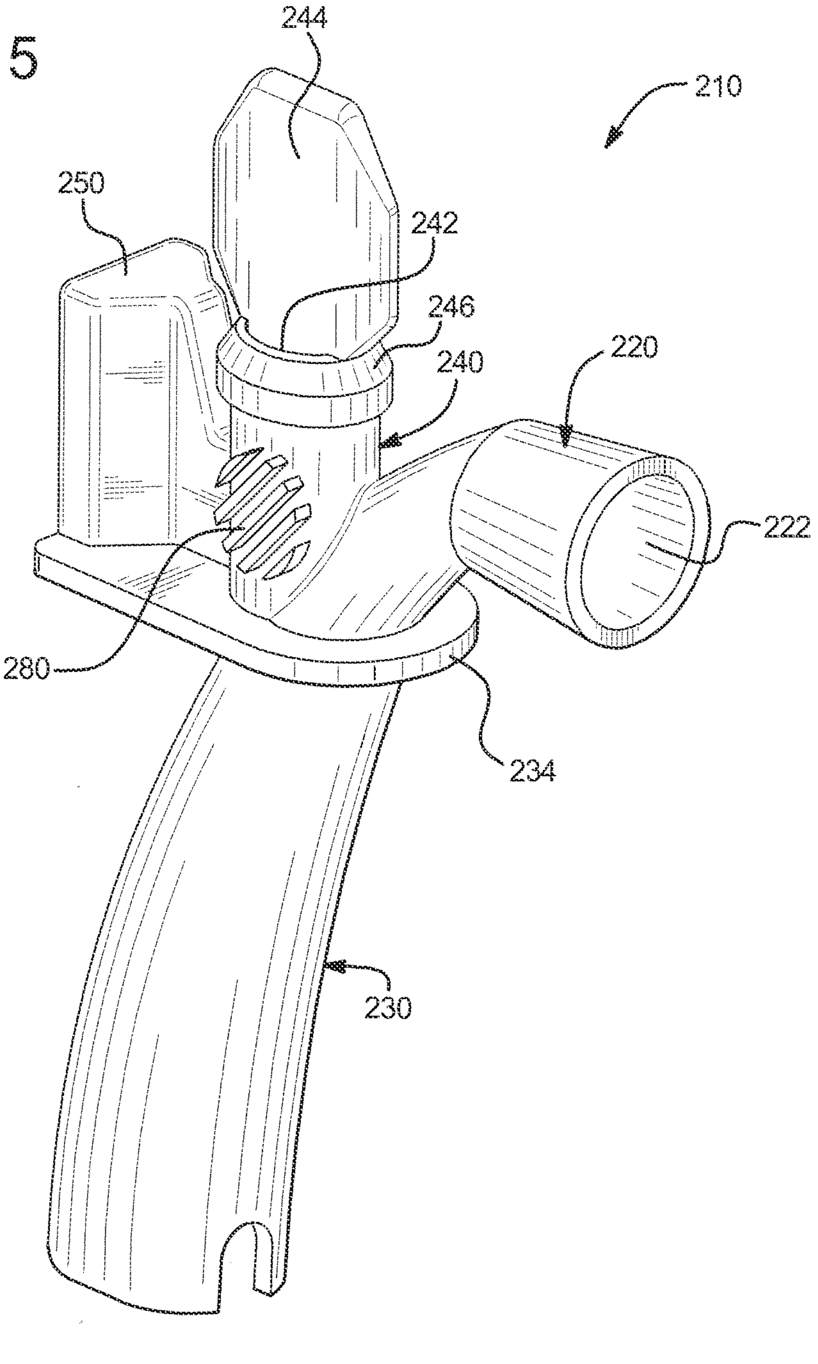
FIG. 5 illustrates a perspective view of a mixing nozzle fitment in another embodiment of the present disclosure.

In an alternative embodiment illustrated in FIG. 5, the present disclosure provides a mixing nozzle fitment 210 including a first elongated cylindrical shaft 220 defining a first passage 222 and a second cylindrical elongated shaft 230 defining a second passage (not shown) and attached to the first elongated cylindrical shaft 220. Second elongated cylindrical shaft 230 includes a coupling member 240. Coupling member 240 can define a passage 242 and can include an expanded member 244 and a catch 246. Second elongated shaft 230 can further include a flange 234.

First elongated shaft 220 and/or second elongate shaft 230 can also include one or more textured grips 280. Textured grips 280 can be mounted on opposing sides of first elongated shaft 220 and/or second elongate shaft 230. During use, textured grips 220 can be grasped by a user who is inserting mixing nozzle fitment 210 into a beverage dispensing device. Textured grips 220 can also be grasped when removing mixing nozzle fitment 210 from the beverage dispensing device.

In yet another embodiment, the present disclosure provides a method of making a beverage. The method comprises providing a mixing nozzle fitment including a first shaft defining an inlet passage, a second shaft defining a curved outlet passage and attached to the first shaft, and a coupling member attached to the second shaft and defining a passage that leads into the curved outlet passage of the second shaft. The first shaft is attached to a diluent dispenser nozzle, and the coupling member is attached to a concentrate tube. A concentrate dispensed through the concentrate tube, and a diluent is dispensed through the diluent dispenser nozzle. The concentrate and the diluent are mixed in and dispensed out of the curved outlet passage of the mixing nozzle fitment to form the beverage.

The diluent can be water or any other suitable diluent such as milk, juice, coffee, tea, soda, etc. The concentrate can be in a suitable form such as a paste, liquid or a combination thereof. The concentrate can have any suitable flavor or combination of flavors as well.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A dispensing device comprising:
a concentrate container;
a tube attached to the concentrate container;
a pump operatively connected to the tube;
a mixing nozzle fitment comprising
a first shaft defining an inlet passage,
a second shaft comprising a first end comprising a fluid outlet of the fitment, and the second shaft is attached to the first shaft at a second end of the second shaft, defines a curved outlet passage that extends from the first end to the second end, and is continuously curved from the first end to the second end, and
a coupling member attached to the second shaft and defining a passage that leads into the curved outlet passage of the second shaft, the tube removably attached to the coupling member; and
a diluent dispensing nozzle removably attached to the first shaft of the mixing nozzle fitment.

2. The dispensing device of claim 1, wherein the concentrate container, the tube, the pump, the diluent dispenser and a portion of the mixing nozzle fitment are contained within a housing.

3. The dispensing device of claim 1, wherein the coupling member comprises an expanded member and a catch for receiving the tube.

4. The dispensing device of claim 1, wherein the second shaft comprises a flange.

5. The dispensing device of claim 1, wherein at least one of the first shaft and the second shaft comprises a textured grip.

6. The dispensing device of claim 1, wherein at least one of the first shaft and the second shaft comprise a cylindrical shape.

7. The dispensing device of claim 1, wherein the second shaft is attached to the first shaft at a joint, and the coupling member is positioned downstream of the joint.

8. The dispensing device of claim 1, wherein the curved outlet passage is continuously curved from the first end to the second end of the second shaft.

9. The dispensing device of claim 2, wherein the housing is arranged for the mixing nozzle fitment to dispense concentrate from the concentrate container mixed with diluent from the diluent dispensing nozzle directly into a cup.

* * * * *